UNITED STATES PATENT OFFICE.

PETER GERION OSTER, OF COLOGNE-ON-THE-RHINE, PRUSSIA, GERMANY.

MANUFACTURE OF OIL AS A SUBSTITUTE FOR LINSEED-OIL.

SPECIFICATION forming part of Letters Patent No. 277,331, dated May 8, 1883.

Application filed December 21, 1882. (No specimens.) Patented in France December 12, 1882; in England December 12, 1882, No. 5,932; in Belgium December 12, 1882, No. 59,840, and in Italy December 21, 1882, XXIX, 460.

*To all whom it may concern:*

Be it known that I, PETER GERION OSTER, a subject of the King of Prussia, residing at Cologne-on-the-Rhine, Prussia, German Empire, have invented certain new and useful Improvements in the Manufacture of Oil as a Substitute for Linseed-Oil; and I do hereby declare the following to be a full, clear, and exact description of the invention, such as will enable others skilled in the art to which it appertains to make and use the same.

This invention has for its object the production of a substitute for linseed-oil in the manufacture of paints; and it consists in the method of manufacturing such substitute, and in a new compound and article of manufacture, substantially as hereinafter fully described, and specifically set forth in the claim.

In carrying out my invention I take linseed or flaxseed oil, from which I first obtain what I term a "thick oil" by exposing said oil to atmospheric influences for a longer or shorter period of time. Such exposure will vary in duration, according to the season and climate, from six to twelve weeks. In conjunction with this thick oil I employ petroleum, cotton-seed oil, clear Burgundy pitch, a siccative, and litharge, in or about in the following proportions, to wit: thick oil, ninety parts; petroleum, six hundred and ten parts; cotton-seed oil, one hundred and seventy parts; Burgundy pitch, one hundred parts; siccative, twenty-eight parts; litharge, two parts.

The compounding of this substitute for linseed-oil is effected in the following manner: The Burgundy pitch is melted, and the cotton-seed oil and thick oil, previously heated to about 80° centigrade, is slowly added thereto under constant agitation, in order to obtain an intimate admixture of these ingredients. When these have been intimately mixed I gradually add thereto the petroleum, likewise previously heated to about 80° centigrade, and while constantly stirring or agitating the compound, which stirring or agitating is continued for a short time after all the petroleum has been added, and the compound maintained at or approximately at the temperature stated. While so stirring the compound the siccative and litharge are gradually added and the whole intimately mixed.

If desired, after the compound has cooled, an essential aromatic oil—such as valerian or other aromatic essence—may be added to the oil to destroy the odor of the petroleum, though this is not absolutely necessary, and the quantity of such aromatic oil or essence will necessarily depend upon the strength of the odor of the petroleum.

The above-described proportions of ingredients may be varied within certain limits and give very satisfactory results.

The compound prepared as described is then allowed to rest, and in a few days it will be perfectly clear and of a yellow or amber color. It is adapted for use in the manufacture of oil-paints, and has all the properties of the linseed-oil heretofore employed, and its cost is much less, not quite half that of linseed-oil.

Having thus described my invention, what I claim is—

The herein-described composition of matter, consisting of thick oil, petroleum, cotton-seed oil, Burgundy pitch, a siccative, and litharge, in or about in the proportions specified.

In testimony whereof I affix my signature in presence of two witnesses.

PETER GERION OSTER.

Witnesses:
   A. DEMELIUS,
   B. ROI.